United States Patent
Liu et al.

(10) Patent No.: US 11,636,873 B2
(45) Date of Patent: Apr. 25, 2023

(54) MAGNETIC RECORDING WRITER WITH IMPROVED MAIN POLE SHAPE

(71) Applicant: Headway Technologies, Inc., Milpitas, CA (US)

(72) Inventors: Ying Liu, Fremont, CA (US); Yuhui Tang, Milpitas, CA (US); Jiun-Ting Lee, Sunnyvale, CA (US); Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/472,304

(22) Filed: Sep. 10, 2021

(65) Prior Publication Data
US 2023/0083836 A1    Mar. 16, 2023

(51) Int. Cl.
*G11B 5/31* (2006.01)
*G11B 5/187* (2006.01)
*G11B 5/127* (2006.01)

(52) U.S. Cl.
CPC .......... *G11B 5/3116* (2013.01); *G11B 5/1278* (2013.01); *G11B 5/187* (2013.01); *G11B 5/315* (2013.01)

(58) Field of Classification Search
CPC ..... G11B 5/1278; G11B 5/3116; G11B 5/315; G11B 5/187; G11B 5/127; G11B 5/1871
See application file for complete search history.

(56) References Cited

U.S. PATENT DOCUMENTS

| | | | |
|---|---|---|---|
| 8,498,079 B1* | 7/2013 | Song | G11B 5/315 360/125.3 |
| 8,755,149 B2* | 6/2014 | Song | G11B 5/3163 360/125.3 |
| 8,792,208 B1* | 7/2014 | Liu | G11B 5/3116 360/125.03 |
| 9,111,564 B1* | 8/2015 | Liu | G11B 5/1278 |
| 9,214,166 B1* | 12/2015 | Zeng | G11B 5/23 |
| 9,299,367 B1* | 3/2016 | Tang | G11B 5/127 |
| 9,406,317 B1* | 8/2016 | Tang | G11B 5/315 |
| 9,466,319 B1* | 10/2016 | Tang | G11B 5/3116 |
| 9,558,763 B1* | 1/2017 | Luo | G11B 5/3116 |
| 9,653,101 B1* | 5/2017 | Liu | G11B 5/235 |
| 9,697,855 B1* | 7/2017 | Liu | G11B 5/315 |
| 10,014,021 B1* | 7/2018 | Liu | G11B 5/1278 |
| 10,339,964 B1* | 7/2019 | Liu | G11B 5/11 |
| 10,522,178 B1* | 12/2019 | Liu | G11B 5/1278 |

(Continued)

*Primary Examiner* — Brian E Miller
(74) *Attorney, Agent, or Firm* — DLA Piper LLP (US)

(57) ABSTRACT

A magnetic recording writer is disclosed. In some embodiments, the writer includes a main pole having a front portion and a back portion, a gap layer surround the main pole at the ABS, and a shield structure. The front portion includes a pole tip at an ABS plane, a pole tip thickness in a down-track direction, and curved sidewalls on each side of a center plane that is orthogonal to the ABS and bisects the main pole. The back portion includes first flared sidewalls extending from the curved sidewalls at an angle between 0 and 25 degrees relative to planes parallel to the center plane. The shield structure includes sidewalls having a sidewall portion facing the main pole and formed substantially conformal to the curved sidewalls up to a height of about 30-200 nm where the sidewall portions no longer follow the shape of the main pole.

13 Claims, 5 Drawing Sheets

(56) References Cited

U.S. PATENT DOCUMENTS

| | | | | |
|---|---|---|---|---|
| 10,714,129 B1* | 7/2020 | Tang | ............... | G11B 5/115 |
| 2011/0102941 A1* | 5/2011 | Guan | ............... | G11B 5/3116 |
| 2012/0257305 A1* | 10/2012 | Tang | ............... | G11B 5/3146 |
| | | | | 29/603.07 |
| 2016/0307586 A1* | 10/2016 | Liu | ............... | G11B 5/1278 |
| 2017/0040031 A1* | 2/2017 | Tang | ............... | G11B 5/1278 |
| 2017/0076742 A1* | 3/2017 | Tang | ............... | G11B 5/3146 |
| 2017/0316794 A1* | 11/2017 | Liu | ............... | G11B 5/1278 |
| 2018/0144768 A1* | 5/2018 | Liu | ............... | G11B 5/1871 |
| 2018/0330748 A1* | 11/2018 | Liu | ............... | G11B 5/3163 |
| 2020/0302956 A1* | 9/2020 | Zhang | ............... | G11B 5/3116 |

\* cited by examiner

MAGNETIC RECORDING WRITER WITH IMPROVED MAIN POLE SHAPE

TECHNICAL FIELD

Embodiments of the present disclosure relate generally to a new writer for magnetic recording heads, such as perpendicular magnetic recording (PMR), microwave assisted magnetic recording (MAMR), and other magnetic recording heads of similar structure, used in hard disk drives.

BACKGROUND

As the data areal density in hard disk drive (HDD) writing increases, writers and media bits are both required to be made in smaller sizes. However, as the writer size shrinks, its writability degrades. In today's PMR and MAMR writer design, the geometries and dimensions of the main pole and side shields are key factors for both overwrite and dBER (delta bit error rate) performance in hard disk drives (HDD). In a fully coupled shield (FCS) where the trailing shield, leading shield, and side shields completely surround the main pole at the ABS, the side shields are first plated on the leading shield, then a conformal non-magnetic material is deposited to form a leading gap and side gaps on the exposed surface of leading shield, and sidewalls of the side shields, respectively. Next, the main pole is plated on the leading gap and side gaps. As a result, the main pole shape proximate to the ABS is mainly defined by the shape of adjacent portions of the side shields. There is always flux leakage between the side shields and main pole due to thin side gaps in current writer designs. A writer that can deliver or pack higher bits per inch (BPI) and higher tracks per inch (TPI) is essential to the area density improvement. If writeability can be sustained, the main pole size must shrink, and a thinner write gap at the main pole trailing (top) surface and a narrower side gap adjoining the main pole sides in the cross-track direction are preferred for better track field gradient (Hy_grad, BPI) and cross-track field gradient (Hy_grad_x, TPI), respectively. However, current PMR and MAMR writers feature a layered main pole (MP) structure, where the down track (DT) dimension remains thin and most volume is supported from the cross track (CT) dimension. This results in an unbalanced volume distribution of the main pole, which limits the growth potential of TPI, Therefore, there is a need for an improved writer design with better balanced MP volume distribution to achieve an increased areal density capacity (ADC) over conventional writer designs.

SUMMARY

Broadly, embodiments of the present disclosure provide a magnetic recording writer with better balanced volume distribution to achieve an increased areal density capacity (ADC) over conventional writer designs.

In some embodiments, the writer includes a main pole having a front portion and a back portion, a gap layer surround the main pole at the ABS, and a shield structure. The front portion includes a pole tip at an ABS plane, a pole tip thickness in a down-track direction, and curved sidewalls on each side of a center plane that is orthogonal to the ABS and bisects the main pole. The back portion includes first flared sidewalls extending from the curved sidewalls at an angle between 0 and 25 degrees relative to planes parallel to the center plane. The gap layer includes a write gap that contacts the trailing edge and has a first cross-track width, and a side gap layer adjoining the main pole sides and leading edge. The shield structure includes a side shield on each side of the center plane, a leading shield, and a trailing shield forming an all wrap around (AWA) shield structure, the side shields each comprise a sidewall portion facing the main pole and formed substantially conformal to the curved sidewalls up to a height of about 30-200 nm where the sidewall portions no longer follow the shape of the main pole.

In some embodiments according to the present disclosure, the main pole includes a leading side, a trailing side, and two sides that connect the leading and trailing sides at an air bearing surface (ABS) and proximate to the ABS, and the two sides are on each side of the center plane that is orthogonal to the ABS and bisects the main pole.

In some embodiments according to the present disclosure, the main pole leading side and trialing side each has a tapered portion with a front end at the ABS, the trailing side tapered portion extends a first height from the ABS, the leading side tapered portion extends further than the trailing side tapered portion and extends a second height from the ABS that is more than the first height.

In some embodiments according to the present disclosure, a total thickness of the main pole in the down-track direction is from 0.25 μm to 1.0 μm.

In some embodiments according to the present disclosure, the back portion further includes second flared sidewalls extending from the first flared sidewalls at an angle between 30 and 75 degrees relative to planes parallel to the center plane. In some embodiments according to the present disclosure, the second flared sidewalls extend from the first flared sidewalls at an angle between 30 and 60 degrees relative to planes parallel to the center plane.

In some embodiments according to the present disclosure, the second flared sidewalls extend from the first flared sidewalls at about 0.3 μm to 1.0 μm from the ABS.

In some embodiments according to the present disclosure, the leading shield includes a hot seed layer that includes a tapered side facing the main pole that is substantially parallel to the leading side tapered portion In some embodiments according to the present disclosure, the tapered side extends up to the second height from the ABS.

In some embodiments according to the present disclosure, the leading shield further includes a back side that is aligned parallel to the leading side of the main pole and extends up to a height between 50 nm and 500 nm. In some embodiments, the back side extends up to a height more than the tapered side.

In some embodiments according to the present disclosure, the trailing shield includes a hot seed layer including a tapered section with a front side at the ABS and a back side at a height from the ABS.

In some embodiments according to the present disclosure, the hot seed layer of the trailing shield further includes a second section adjoining the back side of the tapered section aligned parallel to the trailing side of the main pole.

In some embodiments according to the present disclosure, a back side of the second section is formed at a height more than the back side of the leading shield.

In some embodiments according to the present disclosure, the trailing shield further includes a magnetic layer having a front side at the ABS and a back side that contacts the ABS facing side of a non-magnetic layer.

In some embodiments according to the present disclosure, the back side of the magnetic layer is formed at the same height as the back side of the second section.

BRIEF DESCRIPTION OF THE DRAWINGS

The accompanying drawings, which are incorporated in and constitute a part of this specification, exemplify various embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not generally drawn to scale.

FIGS. 5a-b show a simulated write field profile of the writer according to some embodiments of the present disclosure and the conventional POR writer using Maxwell equation based finite element modeling to calculate the saturated writer field profile.

FIGS. 6a-b show a simulated write field profile of the writer according to some embodiments of the present disclosure and the conventional POR writer using LLG equation based micromagnetic modeling for the writer stray field profile. FIG. 6b shows the stray field for the writer according to some embodiments of the present disclosure.

DETAILED DESCRIPTION

The present disclosure provides a magnetic recording writer is disclosed. In some embodiments, the writer includes a main pole having a front portion and a back portion, a gap layer surround the main pole at the ABS, and a shield structure. The front portion includes a pole tip at an ABS plane, a pole tip thickness in a down-track direction, and curved sidewalls on each side of a center plane that is orthogonal to the ABS and bisects the main pole. The back portion includes first flared sidewalls extending from the curved sidewalls at an angle between 0 and 25 degrees relative to planes parallel to the center plane. The gap layer includes a write gap that contacts the trailing edge and has a first cross-track width, and a side gap layer adjoining the main pole sides and leading edge. The shield structure includes a side shield on each side of the center plane, a leading shield, and a trailing shield forming an all wrap around (AWA) shield structure, the side shields each comprise a sidewall portion facing the main pole and formed substantially conformal to the curved sidewalls up to a height of about 30-200 nm where the sidewall portions no longer follow the shape of the main pole. In some embodiments, the height is about 60 to 150 nm.

In the drawings, the y-axis is in a cross-track direction, the z-axis is in a down-track direction, and the x-axis is in a direction orthogonal to the ABS and towards a back end of the writer structure. Thickness refers to a substantially down-track distance. It should be understood that thickness is the direction perpendicular to the film plane, typically 0~30 degrees from the z-axis direction to create a MP surface slope in most of current writers. Width is a cross-track distance, and height is a distance from the ABS in the x-axis direction. In some of the drawings, a magnetic bit is considerably enlarged over actual size in order to more easily depict a magnetization therein.

Figure 1:
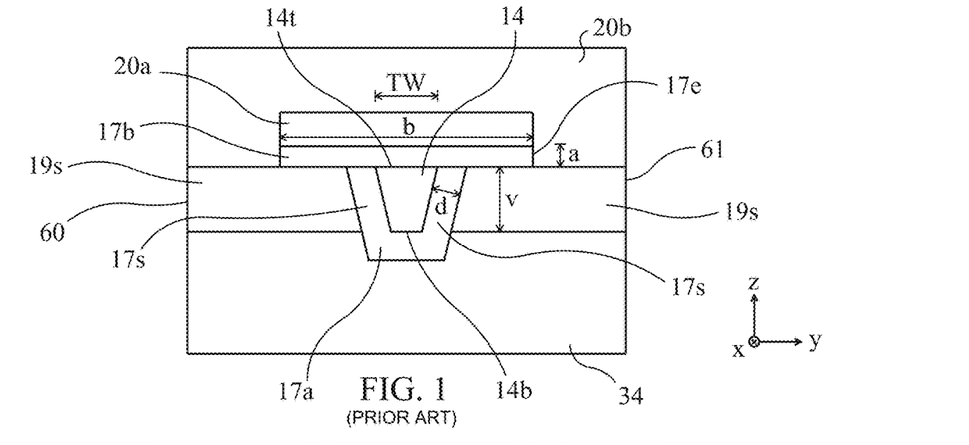
FIG. 1 is an ABS view of a writer according to some embodiments of the present disclosure using a process of record (POR) wherein the trailing shield, side shields, and leading shield form an all wrap around (AWA) shield structure around the main pole.

Referring to FIG. 1, an ABS view of a fully coupled shield (FCS) also known as an all wrap around (AWA) shield design currently fabricated by the inventors is shown wherein a main pole has a front portion referred to as a write pole with a medium facing side 14 comprising a leading edge 14b, and a trailing edge 14t which defines a track width TW. The main pole extends behind the plane of the ABS to a back portion (not shown) that is magnetically connected to the trailing shield comprising an upper kG magnetic layer 20b and a hot seed layer 20a where the hot seed layer and write gap 17b have a cross-track width b. The write gap has thickness a. In some embodiments, the magnetic layer 20b is made of a 16-19 kG material. In some embodiments, the hot seed layer 20a is made of a 19-24 kG material.

Side shields 19s are made of a magnetic layer, have a down-track thickness v, and are separated from the write pole by a side gap 17s having a cross-track width d. In some embodiments, the side shields 19s are made of a 10-16 kG magnetic layer. Each side shield has a top surface that adjoins trailing shield layer 20b between a side 17e of the write gap and a side 60 (or 61) of the side shield. There is also a leading shield 34, which is separated from leading edge 14b by a lead gap 17a. The leading shield adjoins the side shields, and with the magnetic layer 20b thereby forming an AWA shield design to improve field gradients in the down-track and cross-track directions as well as adjacent track erasure (ATE) performance.

In some embodiments, all shield layers and the main pole may be selected from one of CoFeN, CoFeNi, NiFe, or CoFe.

Figure 2A:
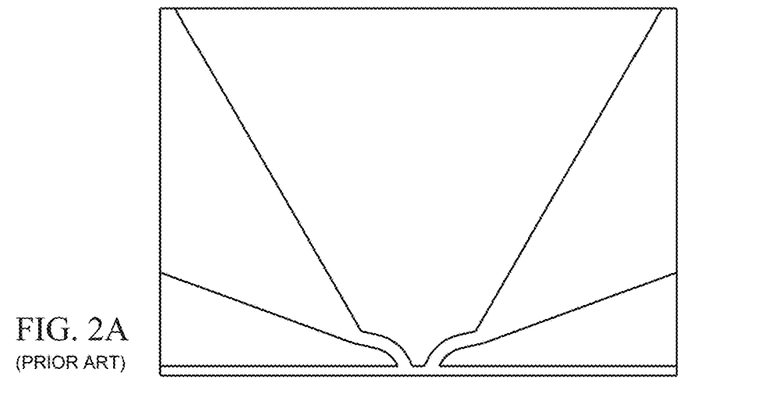
FIG. 2a is a top-down view of a convention POR writer wherein the trailing shield and write gap are removed to depict the main pole and side shields.

FIG. 2a shows a top-down view of the side shield and main pole structure of a conventional writer with the trailing shield and write gap removed. The main pole and side shields have a process of record (POR) design. Center plane bisects the main pole including a back portion and is aligned orthogonal to the ABS. A front portion of the main pole also known as the write pole has a trailing edge at the ABS, and has a curved sidewall on each side of the center plane (forming a neck portion of the main pole) wherein a first portion of curved sidewall is proximate to the ABS, and a second portion is proximate to corner where the curved sidewall connects with flared side of the main pole back portion. First portion forms an attack angle y from 0 to 40 degrees, and preferably 18-20 degrees, with respect to center plane. In general, as the angle γ increases, the cross-track magnetic field gradient degrades. However, as angle γ approaches 0 degrees, the magnetic field from the main pole decreases dramatically. Without being bound to any particular theory, it is believed that 18 to 20 degrees for the angle γ is an optimum range to maintain an acceptable cross-track field gradient and magnetic field from the main pole. Preferably, a first portion of side shield sidewall that is a side gap distance d from first portion also is formed at the y angle with respect to the center plane.

Side shields have a second sidewall portion facing the write pole and formed substantially conformal to curved sidewall portion up to a first height where the sidewall no longer follows the shape of the write pole and continues to an end at sides of the side shield. The closest approach of main pole back portion to the ABS is at a plane that includes corners and is a second height (e.g, >150 nm) from the ABS. In some embodiments, the second height is 80 to 150 nm from the ABS. Curved sidewall portion and second sidewall portion that are proximate to corners form a maximum angle δ of about 60 degrees with respect to center plane.

In some embodiments, an insulation layer separates the side shield and the main pole. The side shields have a shallow taper angle of about 10 to 40 degrees. As a result, the separation between the side shields 19s and the main pole will become larger will be larger the further above the ABS level.

Figure 2B:
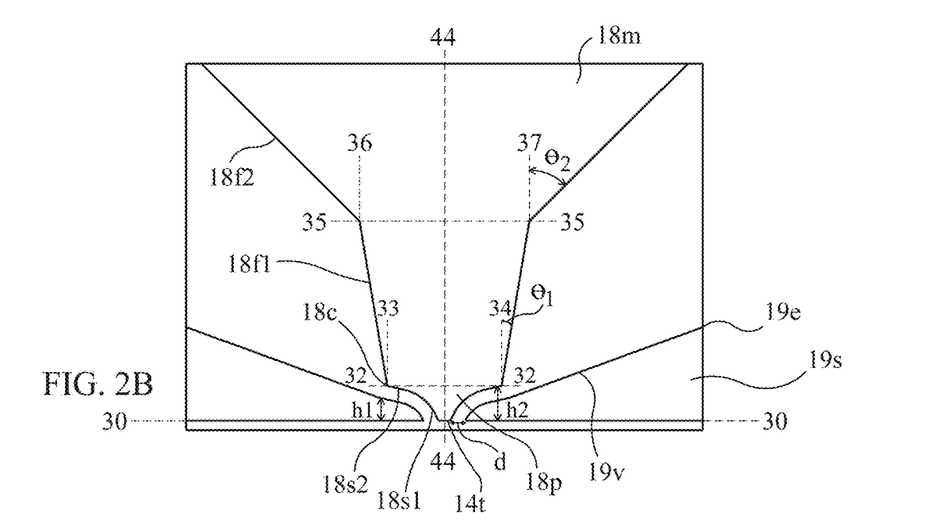
FIG. 2b is a top-down view of the writer according to some embodiments of the present disclosure wherein the trailing shield and write gap are removed to depict the main pole and side shields.

FIG. 2b shows a top-down view of the side shield and main pole structure of a writer according to some embodiments of the present disclosure with the trailing shield and write gap removed. In some embodiments, the main pole and side shields have a process of record (POR) design. Center plane 44-44 bisects the main pole and is aligned orthogonal to the ABS 30-30. The main pole includes a back portion 18m and a front portion of the main pole also known as the write pole 18p has a trailing edge 14t at the ABS, and has a curved sidewall on each side of the center plane 44-44 wherein a first portion 18s1 of curved sidewall is proximate to the ABS, and a second portion 18s2 is proximate to corner 18c where the curved sidewall connects with first flared side 18f1 of the main pole back portion.

In some embodiments, first flared side 18f1 of the main pole back portion flare outward from dashed lines 33, 34, which are perpendicular to the ABS 30-30 and parallel to the center plane 44-44, at an angle $\theta_1$ from the plane 32-32. The angle $\theta_1$ is preferably between 0 degrees and 25 degrees. In some embodiments, first flared side 18f1 can maintain the angle $\theta_1$ through the back portion 18m. In some embodiments, first flared side 18f1 connects with second flared side 18f2 at about 0.3 μm to 1.0 μm from the ABS. In some embodiments, second flared side 18f2 flare outward from dashed lines 36, 37, which are perpendicular to the ABS 30-30 and parallel to the center plane 44-44, at an angle $\theta_2$ from the plane 35-35. In some embodiments, angle $\theta_2$ is more than angle $\theta_1$. In some embodiments, angle $\theta_2$ is between 30 degrees and 75 degrees. In some embodiments, angle $\theta_2$ is between 30 degrees and 60 degrees. Without being bound to any particular theory, the main pole will exert less field onto the side shield as the angle $\theta_1$ decreases. Thus, the side shield stray field can be reduced and ATI and TPI can improve accordingly.

In some embodiments, first portion 18s1 forms an angle from 0 to 40 degrees, and preferably 18-20 degrees, with respect to center plane 44-44. In general, as the angle increases, the cross-track magnetic field gradient degrades. However, as the angle approaches 0 degrees, the magnetic field from the main pole decreases dramatically. Therefore, an angle of 18 to 20 degrees is a preferable range to maintain an acceptable cross-track field gradient and magnetic field from the main pole.

Side shields 19s have a sidewall portion 19v facing the write pole and formed substantially conformal to curved sidewall portion 18s2 up to height h1 of about 30-200 nm where the sidewall 19v no longer follows the shape of the write pole and continues to an end 19e at sides 60 (or 61) of the side shield. In some embodiments, the height h1 is from about 60 to 150 nm. A first portion of sidewall portion 19v is a side gap distance d from first portion 18s1. The closest approach of main pole back portion 18m to the ABS is at plane 32-32 that includes corners 18c and is a second height h2 of 80 to 400 nm from the ABS. In some embodiments, the second height h2 is greater than the first height h1. In some embodiments, the height h2 is from about 80 to 350 nm, 80 to 300 nm, 80 to 250 nm, 80 to 200 nm, and 80 to 150 nm. Curved sidewall portion 18s2 that are proximate to corners 18c and substantially parallel to sidewall 19v form a maximum angle of about 85 to 95 degrees with respect to center plane 44-44.

Figure 3A:
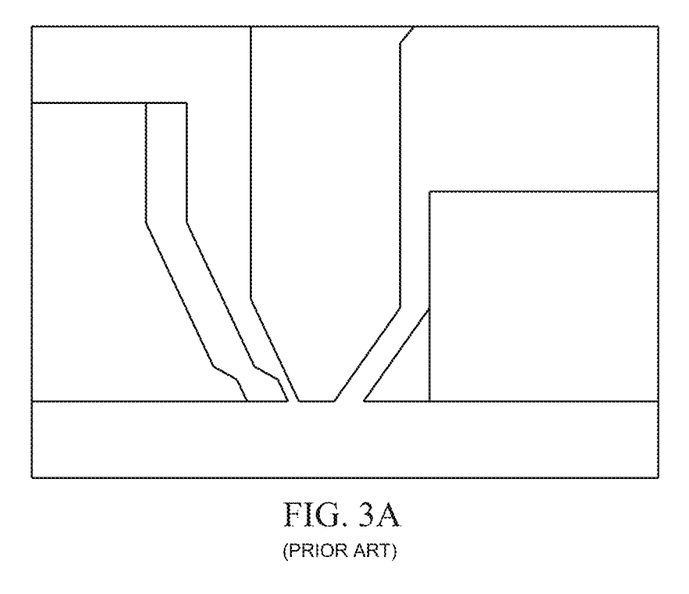
FIG. 3a is a down-track cross-sectional view of a conventional POR writer.
Figure 3B:
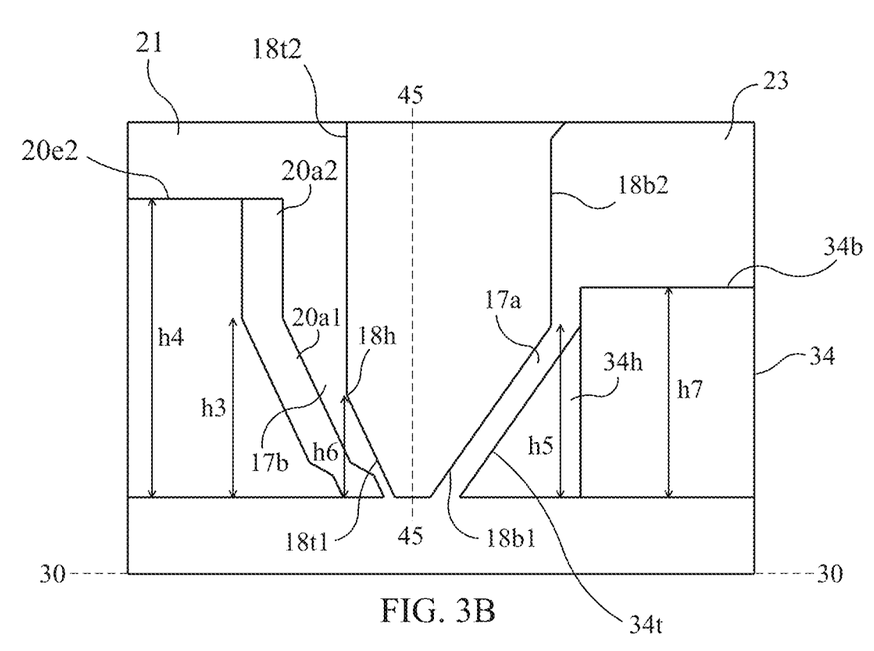
FIG. 3b is a down-track cross-sectional view of the writer according to some embodiments of the present disclosure.

FIG. 3a shows a down-track cross-sectional view along plane 44-44 for a conventional writer. FIG. 3b shows a down-track cross-sectional view along plane 44-44 that applies to FIG. 2b and depicts an embodiment where the main pole has a tapered leading side 18b1 that extends from the ABS 30-30 to a height h5. There is a second leading side 18b2 of the main pole that is aligned parallel to a second plane 45-45 which is orthogonal to the ABS and to plane 44-44. The second leading side extends from an end of the tapered leading side toward a back end of the writer. Moreover, the main pole has a tapered trailing side 18t1 with a front end at the ABS and a back end at corner 18h, i.e., extending a height h6 toward corner 18h. The height h6 of the tapered trailing side 18t1 is less than the height h5 of the tapered leading side 18b1. A second trailing side 18t2 of the main pole has a front end adjoining the back end of tapered trailing side 18t1 and is aligned parallel to the second plane 45-45.

The main pole shape on the trailing side remains the same in the conventional writer and the writer according to some embodiments of the present disclosure, like the one shown in FIG. 3b. The MP leading side extends much further as shown in FIG. 3b as compared to the conventional writer shown in FIG. 3a, which allows the total down-track direction thickness to be much larger. In some embodiments, the total thickness of the main pole in the down-track direction is from 0.25 μm to 1.0 μm and significantly thicker than the total thickness of the main pole in the down-track direction of the conventional writer. In some embodiments, the total thickness of the main pole in the down-track direction is more than 0.25 μm to 1.0 μm. In some embodiments, the total thickness of the main pole in the down-track direction is from 0.30 μm to 1.0 μm, 0.35 μm to 1.0 μm, 0.40 μm to 1.0 μm, 0.45 μm to 1.0 μm, 0.50 μm to 1.0 μm, 0.55 μm to 1.0 μm, or 0.60 μm to 1.0 μm. Without being bound to any particular theory, the preserved trailing side features can help maintain the trailing shield response and BPI in the conventional writer, but as the leading side will be overwritten by the next bit, modification on the leading side can have a minimum impact on the transition sharpness written on media.

In some embodiments, leading shield hot seed layer 34h has a tapered side 34t facing the main pole that is formed substantially parallel to tapered leading side 18b1 of the main pole. In some embodiments, leading shield hot seed layer 34h further includes a side facing the leading shield 34 that has a height h5. Leading shield 34 further includes a magnetic layer that has a side facing the main pole that is aligned parallel to plane 45-45 and a back side 34b at a height h7 that may be as far as 1 micron from the ABS. In some embodiments, height h7 of back side 34b is more than height h5 of the side facing the leading shield 34. Back side 34b at the height h7 adjoins an ABS facing side of insulation layer 23. Leading gap 17a preferably has a uniform thickness in a down-track direction and contacts both of hot seed layer 34h and main pole tapered leading side 18b1.

In some embodiments, leading gap 17a and write gap 17b contact main pole sides 18b1, 18t1, respectively. Write gap 17b preferably has a uniform thickness in a down-track direction and is formed between a tapered section 20a1 of the first trailing shield hot seed layer 20a and main pole trailing side 18t1. Tapered section 20a1 has a front side at the ABS 30-30, a back side at a third height h3, and a main pole facing side that contacts the trailing side of the write gap and is substantially parallel to main pole trailing side 18t1. A second section 20a2 of the first trailing shield hot seed layer adjoins the back side of tapered section 20a1 at the third height h3, has a back side that adjoins an ABS facing side of non-magnetic layer 21, has a main pole facing side that contacts non-magnetic layer 21, and has a lengthwise dimension along the x-axis that is parallel to plane 45-45. In some embodiments, the back side of second section 20a2 is formed at the same height h4 as the back side 20e2 of the second magnetic layer 20b and adjoins the ABS facing side of non-magnetic layer 21. The second magnetic layer 20b has a front side at the ABS and a back side that contacts the ABS facing side of non-magnetic layer 21.

Figure 4:
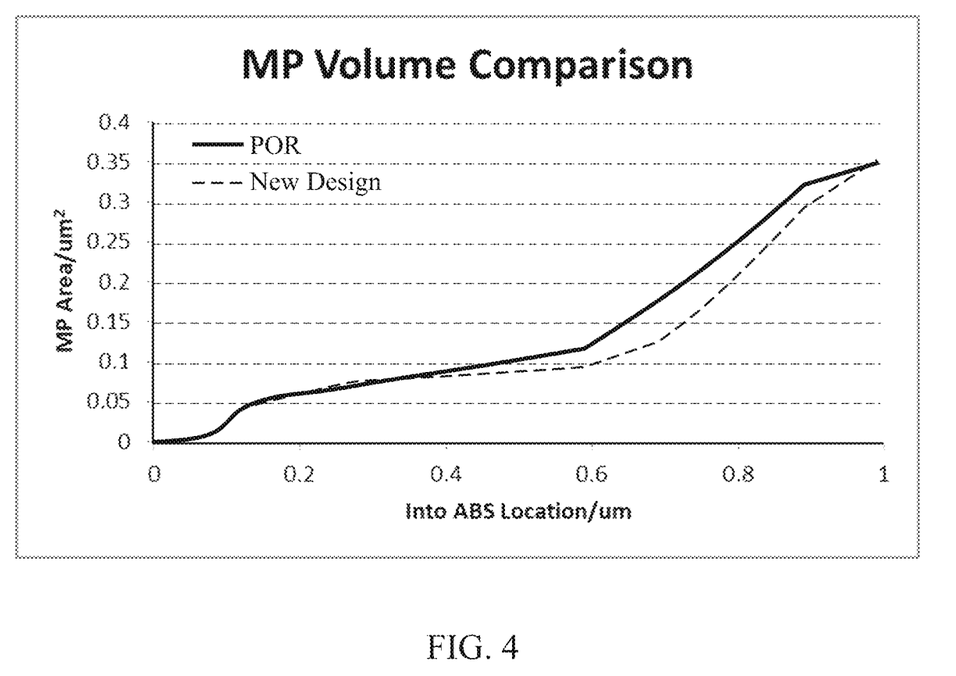
FIG. 4 is a main pole volume comparison between the writer according to some embodiments of the present disclosure and the conventional POR writer.

FIG. 4 is a graph comparing the main pole volume of the conventional writer and the writer according to some embodiments of the present disclosure. More specifically, in FIG. 4, the MP area at corresponding into ABS location is calculated and plotted for the conventional writer and the writer according to some embodiments of the present disclosure. The conventional process of record (POR) writer has a MP flare angle of 30 degrees and a MP down-track thickness of 0.25 μm. The writer according to some embodiments of the present disclosure, plotted in FIG. 4 has an initial MP flare angle of 10 degrees and then a second MP flare angle of 45 degrees above 0.7 FIG. 4 shows that up to about 0.4 μm into the ABS, the writer of the present disclosure can approximate the MP volume as the conventional writer. From 0.4 μm to 0.7 the MP volume can fall gradually behind, but because of the increased increase angle of 45 degrees above 0.7 the volume loss can be made up by about 1.0 μm into ABS. It is believed that with a larger MP down-track thickness, the MP volume of the writer of the present disclosure can easily approximate the MP volume of the conventional writer.

Figure 5A:
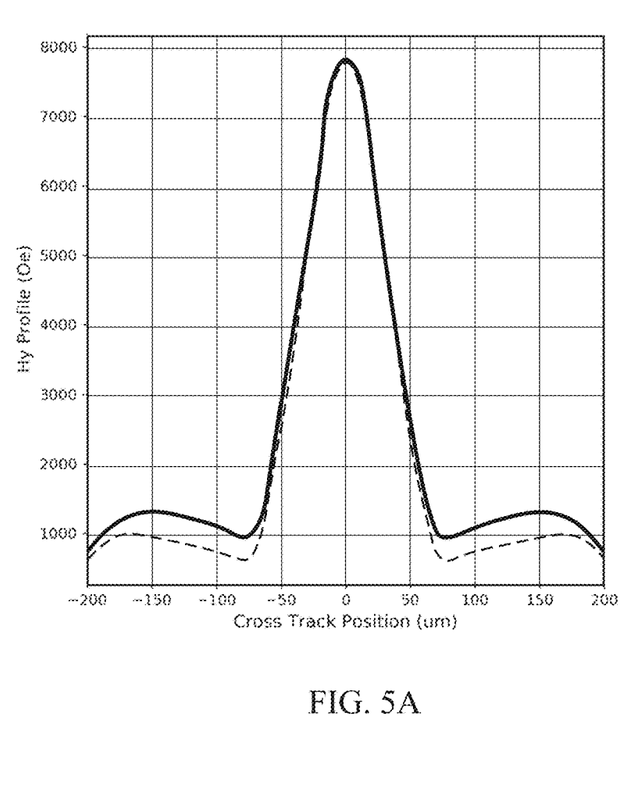
FIG. 5a shows the write field ($H_y$) profile along the cross-track direction for the conventional writer and the writer according to some embodiments of the present disclosure.
Figure 5B:
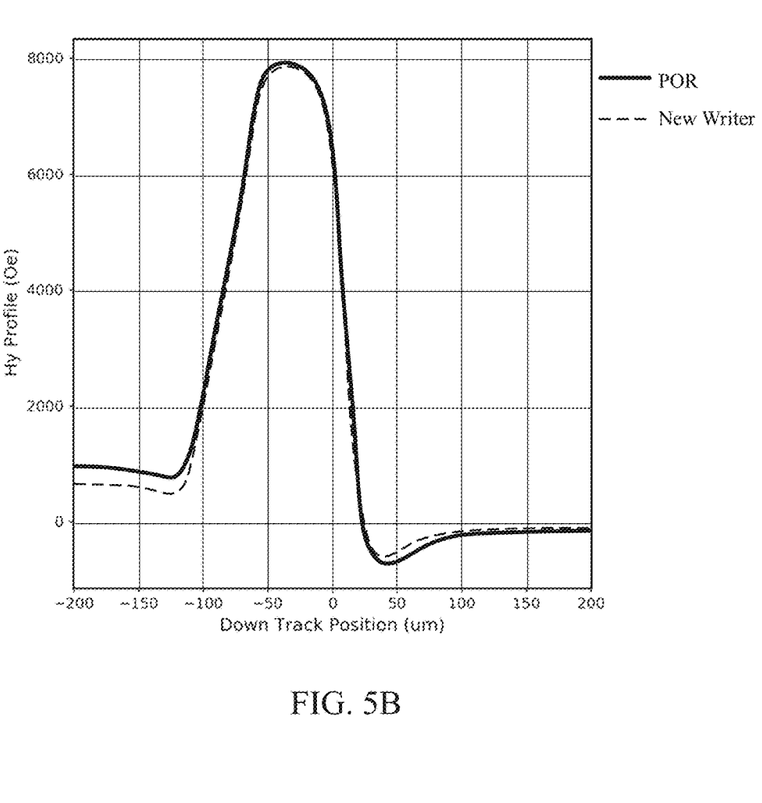
FIG. 5b shows the write field ($H_y$) profile along the down-track direction for the conventional writer and the writer according to some embodiments of the present disclosure.

FIG. 5 is a comparison of the write field ($H_y$) profile for the conventional writer and the writer according to some embodiments of the present disclosure. FIG. 5a shows the write field ($H_y$) profile along the cross-track direction for the conventional writer and the writer according to some embodiments of the present disclosure. FIG. 5b shows the write field ($H_y$) profile along the down-track direction for the conventional writer and the writer according to some embodiments of the present disclosure. As shown in FIG. 5a, the track center maximum write field ($H_y$) along the cross-track direction is similar between the conventional writer and the writer according to some embodiments of the present disclosure. However, the stray field causing adjacent track interference is clearly much less, signifying that less MP volume in the cross-track direction is beneficial. In FIG. 5b, the track center maximum write field ($H_y$) along the down-track direction is similar between the conventional writer and the writer according to some embodiments of the present disclosure, showing that the MP volume change in the improved writer does not hurt writeability. The trailing side stray field is less negative, but this loss in the down-track direction is less than the gain in the cross-track direction. Therefore, the writer according to some embodiments of the present disclosure having a better balanced volume distribution than the conventional writer and an overall net gain in area density capability ADC.

Figure 6A:
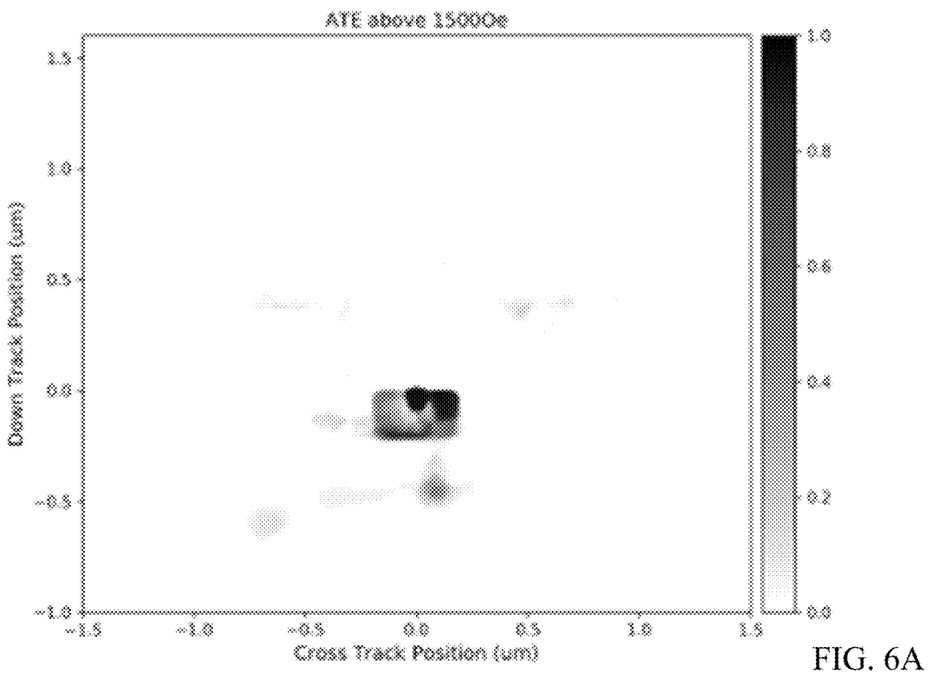
FIG. 6a shows the stray field above 1500 Oe for the conventional POR writer.
Figure 6B:
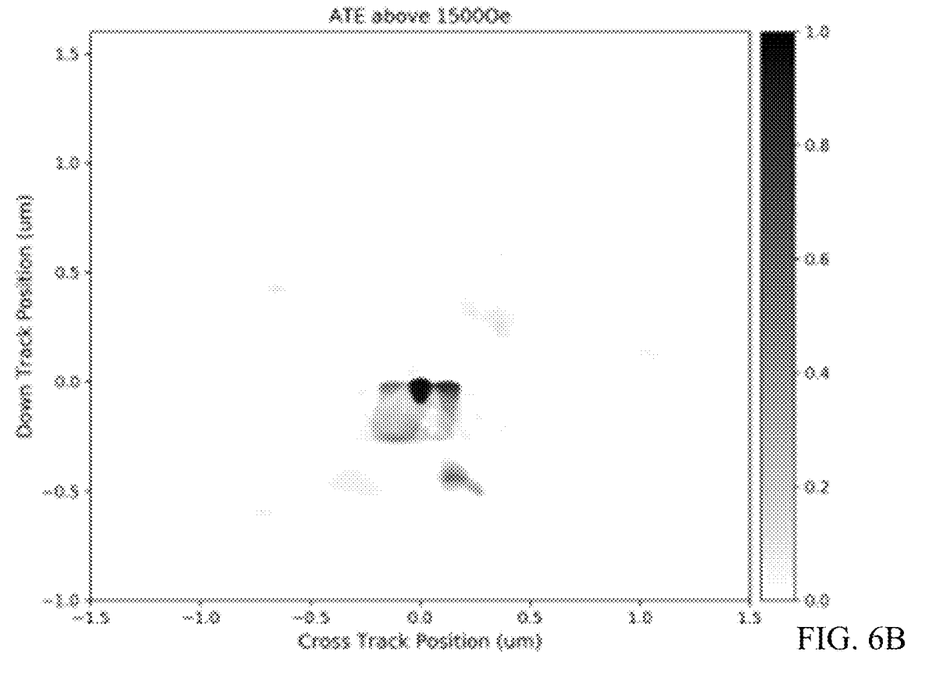

FIGS. 6a-b show a simulated write field profile of the writer according to some embodiments of the present disclosure and the conventional POR writer using LLG equation based micromagnetic modeling for the writer stray field profile. FIG. 6a shows the stray field above 1500 Oe for the conventional POR writer. FIG. 6b shows the stray field for the writer according to some embodiments of the present disclosure. The stray field in the cross-track direction is clearly cleaner for the writer according to some embodiments of the present disclosure than the stray field in the cross-track direction of the conventional writer, which indicates that there is less adjacent track interference, resulting in a better TPI. Accordingly, the writer according to some embodiments of the present disclosure improves both TPI and ATI with a minimal tradeoff on BPI, resulting in an overall ADC gain.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A magnetic recording writer, comprising:
a main pole having a front portion and a back portion, the front portion includes a pole tip at an ABS plane, a pole tip thickness in a down-track direction, and curved sidewalls on each side of a center plane that is orthogonal to the ABS and bisects the main pole, the back portion includes first flared sidewalls extending from the curved sidewalls at an angle between 0 and 25 degrees relative to planes parallel to the center plane, wherein the back portion further includes second flared sidewalls extending from the first flared sidewalls at an angle between 30 and 75 degrees relative to planes parallel to the center plane;
a gap layer surrounding the main pole at the ABS and comprising a write gap that contacts the trailing edge and has a first cross-track width, and a side gap layer adjoining the main pole sides and leading edge; and
a shield structure including a side shield on each side of the center plane, a leading shield, and a trailing shield forming an all wrap around (AWA) shield structure, the side shields each comprise a sidewall portion facing the main pole and formed substantially conformal to the curved sidewalls up to a height of about 30-200 nm where the sidewall portions no longer follow the shape of the main pole.

2. The writer of claim 1, wherein the main pole includes a leading side, a trailing side, and two sides that connect the leading and trailing sides at an air bearing surface (ABS) and proximate to the ABS, and the two sides are on each side of the center plane that is orthogonal to the ABS and bisects the main pole.

3. The writer of claim 2, wherein the main pole leading side and trialing side each has a tapered portion with a front end at the ABS, the trailing side tapered portion extends a first height from the ABS, the leading side tapered portion extends further than the trailing side tapered portion and extends a second height from the ABS that is more than the first height.

4. The writer of claim 1, wherein a total thickness of the main pole in the down-track direction is from 0.25 μm to 1.0 μm.

5. The writer of claim 1, wherein the second flared sidewalls extend from the first flared sidewalls at about 0.3 μm to 1.0 μm from the ABS.

6. The writer of claim 3, wherein the leading shield includes a hot seed layer that includes a tapered side facing the main pole that is substantially parallel to the leading side tapered portion.

7. The writer of claim 6, wherein the tapered side extends up to the second height from the ABS.

8. The writer of claim 6, wherein the leading shield further includes a back side that is aligned parallel to the leading side of the main pole and extends up to a height between 50 nm and 500 nm.

9. The writer of claim 1, wherein the trailing shield includes a hot seed layer including a tapered section with a front side at the ABS and a back side at a height from the ABS.

10. The writer of claim 9, wherein the hot seed layer of the trailing shield further includes a second section adjoining the back side of the tapered section aligned parallel to the trailing side of the main pole.

11. The writer of claim 10, wherein a back side of the second section is formed at a height more than the back side of the leading shield.

12. The writer of claim 11, wherein the trailing shield further includes a magnetic layer having a front side at the ABS and a back side that contacts the ABS facing side of a non-magnetic layer.

13. The writer of claim 12, wherein the back side of the magnetic layer is formed at the same height as the back side of the second section.

\* \* \* \* \*